United States Patent [19]

Durden

[11] Patent Number: 4,772,183

[45] Date of Patent: Sep. 20, 1988

[54] HIGH TEMPERATURE OIL CIRCULATING PUMP

[76] Inventor: Hugh B. Durden, 11 Turner Chapel Rd., Rome, Ga. 30161

[21] Appl. No.: 69,185

[22] Filed: Jul. 2, 1987

[51] Int. Cl.⁴ ............................................. F04B 15/04
[52] U.S. Cl. .................................. 417/423 R; 415/112
[58] Field of Search .......... 417/423 M, 423 T, 424 R, 417/306; 425/170 A, 110, 111, 112, 176, 168 R, 168 A, 169

[56] References Cited

U.S. PATENT DOCUMENTS

| | | | |
|---|---|---|---|
| 1,886,714 | 11/1932 | Moss | 415/111 |
| 2,149,777 | 3/1939 | Kidwell | 417/306 |
| 2,448,717 | 9/1948 | Jeffcock | 415/112 |
| 2,677,328 | 5/1954 | Vitek | 415/110 |
| 3,698,830 | 10/1972 | Goyne | 417/423 M X |
| 4,335,886 | 6/1982 | Frey et al. | 415/111 X |

*Primary Examiner*—Leonard E. Smith
*Assistant Examiner*—Eugene L. Szczecina, Jr.

*Attorney, Agent, or Firm*—Kimmel, Crowell & Weaver

[57] ABSTRACT

A pump assembly for effecting fluid flow of high temperature cooking oil in a cooker and the like includes a support extension tube having a drive motor mounted at one end thereof and a centrifugal pump housing mounted at the other end, an impeller contained within the pump housing and drivingly connected to the drive motor by a drive shaft connection, a bearing in the housing for supporting the drive shaft closely adjacent to the impeller, and a runner and skirt structure between the drive shaft and the support extension tube for the purpose of minimizing oil leakage. The runner and skirt having a designed clearance to avoid interference, binding or freeze-up of the rotating elements due to temperature expansion thereof after operation with high temperature cooking oil over an extended period of time. A vacuum connection between the pump input and the support tube, together with a vacuum breaker structure for the support tube, also are very important included elements of this pump assembly.

11 Claims, 5 Drawing Sheets

HIGH TEMPERATURE OIL CIRCULATING PUMP

BACKGROUND OF THE INVENTION

1. Field of the Invention

This invention relates generally to a circulating pump for pumping oil, and especially high temperature oil as used in deep fat cookers.

2. Descriotion of the Prior Art

A common problem with known devices for pumping high temperature oil for deep fat cookers and the like is that conventional type seals deteriorate very quickly because of the high temperature cooking oil. It is quite common for such pumps to require maintenance and/or complete removal from operation for re-building every month or so during intensive use.

Another problem with known type centrifugal pumps for pumping fluid is that there is not only a problem with keeping bearing seals and leak seals in good working order, but under high temperature operation, it is also very common for such pumps to seize up and freeze.

None of the known prior art devices offer the new and novel features of the present invention.

SUMMARY OF THE INVENTION

An object of the present invention is to provide a long life, highly efficient circulating pump for hot cooking oil as used in cookers and the like.

Another object of the present invention is to provide a pump which can be easily installed in place of existing oil circulating pumps and will greatly improve the efficiency and life of the overall cooking system in which it is installed.

A further object of the this invention is to provide a centrifugal type pump having a labyrinth seal as well as increased structural clearances in the longitudinal direction to overcome the tendency for freezing of the pump due to expansion caused by high temperature operation.

The present invention has a number of new and novel features. Among them is a unique bearing and leak eliminating labyrinth seal construction, as well as increased longitudinal clearances for preventing and avoiding binding and hangups due to temperature expansion of the drive components.

A centrifugal type pump arranged for vertical mounting includes a drive motor at the top connected to a tubular support of substantial length and a centrifugal pump mounted at the bottom end of this support. A centrifugal pump casing, together with input and output elements and a vane-type impeller rotatably mounted therewithin, comprise the pump. A longitudinal drive shaft between the output shaft of the motor and an input hub of the impeller provide a positive drive therefor. A pump mounting plate is affixed to the lower end of the tubular shaft and has a central aperture for receiving an impeller supporting bearing therein. In addition, a runner and skirt having specifically structured clearances therebetween are mounted in the drive shaft and the tubular support, respectively. The hollow extension tube provides for an inner vacuum chamber between the bottom of the drive motor and the pump mount flange. A suction input is provided in this extension tube closely adjacent to the skirt structure and connected by a suitable flexible hose to an input opening into the centrifugal pump. A vacuum breaker is also provided at the upper end of the tubular extension tube for proper control and operation of the vacuum in the device.

During operation of this invention, the vacuum in the extension tube sucks up any slight leakage of oil from the centrifugal pump and the increased spacing of the component sealless elements prevents binding and freezing of the pump and drive therefor when longitudinal expansion occurs due to the high temperature of the cooking coil being pumped.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
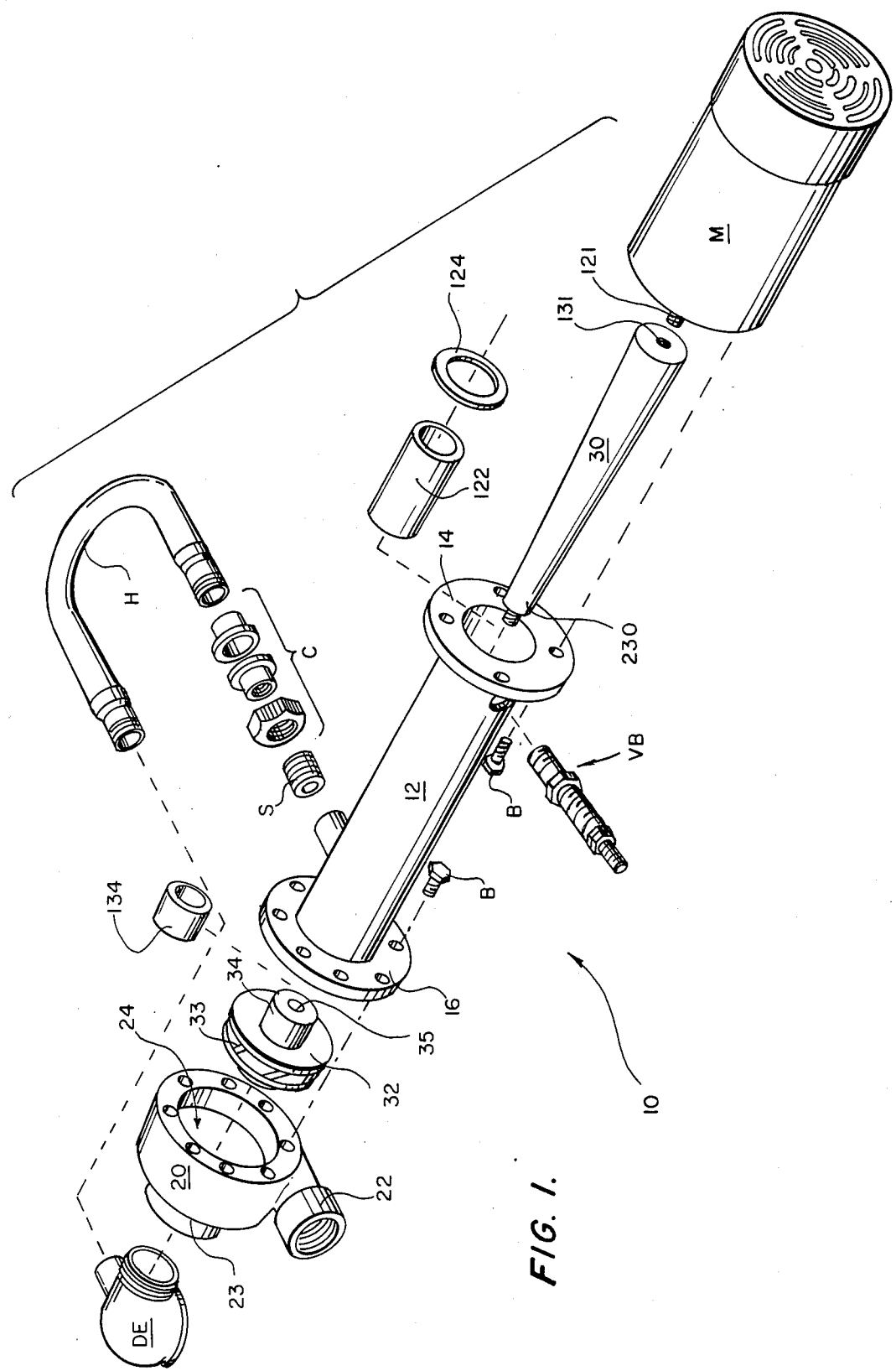
FIG. 1 is an exploded perspective view of the pump of the present invention.

Referring to FIG. 1 of the drawings, reference numeral 10 indicates in general the pump of the present invention. This pump is shown in exploded perspective in FIG. 1 and in vertical orientation in FIG. 2 as preferably connected for use with a hot oil cooker or fryer assembly. The central main structural element is a hollow extension tube 12 provided with transverse flanges 14 and 16 at the respective ends thereof. Appropriate bolt apertures in flange 14 allow this flange to be bolted by bolts B to a drive motor M. Similarly, the flange 16 is appropriately bolted to a pump housing 20 having a lower input hub 23 and an output portion 22. A double elbow DE is preferably used at the input 23 of pump housing 20 for connection of a suction hose H and an input hose IH. The pump housing 20 has a central enlarged area 24 which contains a rotatable impeller element 32. Element 32 has suitable vanes 33 for effecting fluid movement in conventional fashion. A hub 34 integral with impeller 32 has a central threaded aperture 35 therein. A drive shaft 30 having a threaded end 62 drivingly engaged in the threaded aperture 35 of the impeller provides the rotational movement to impeller 32. The motor M is provided with an output shaft having a threaded end 121 which is screwed into threaded aperture 131 on the upper end of drive shaft 30.

Mounted within the hollow extension tube 12 is a sleeve 122 suitably spaced from and mounted near the upper end of tube 12 by a ring 124. The lower end of the sleeve 122 is spaced centrally of extension tube 12 by a skirt 125. Skirt 125 has a central aperture 123 which closely and fixedly engages with sleeve 122. The upper end of skirt 125 has a flange 225 with four or more grooves 127 extending inwardly from the outer circumference of the flange. These grooves 127 permit fluid flow between the two volumes within extension tube 12 as defined by sleeve 122 and flange 225. The other end of skirt 125 has a longitudinal extension 126 extending therefrom for close association with a runner mounted upon the drive shaft 30 as described below. The skirt 125 also has a circumferential recess 129 therearound.

Figure 5:
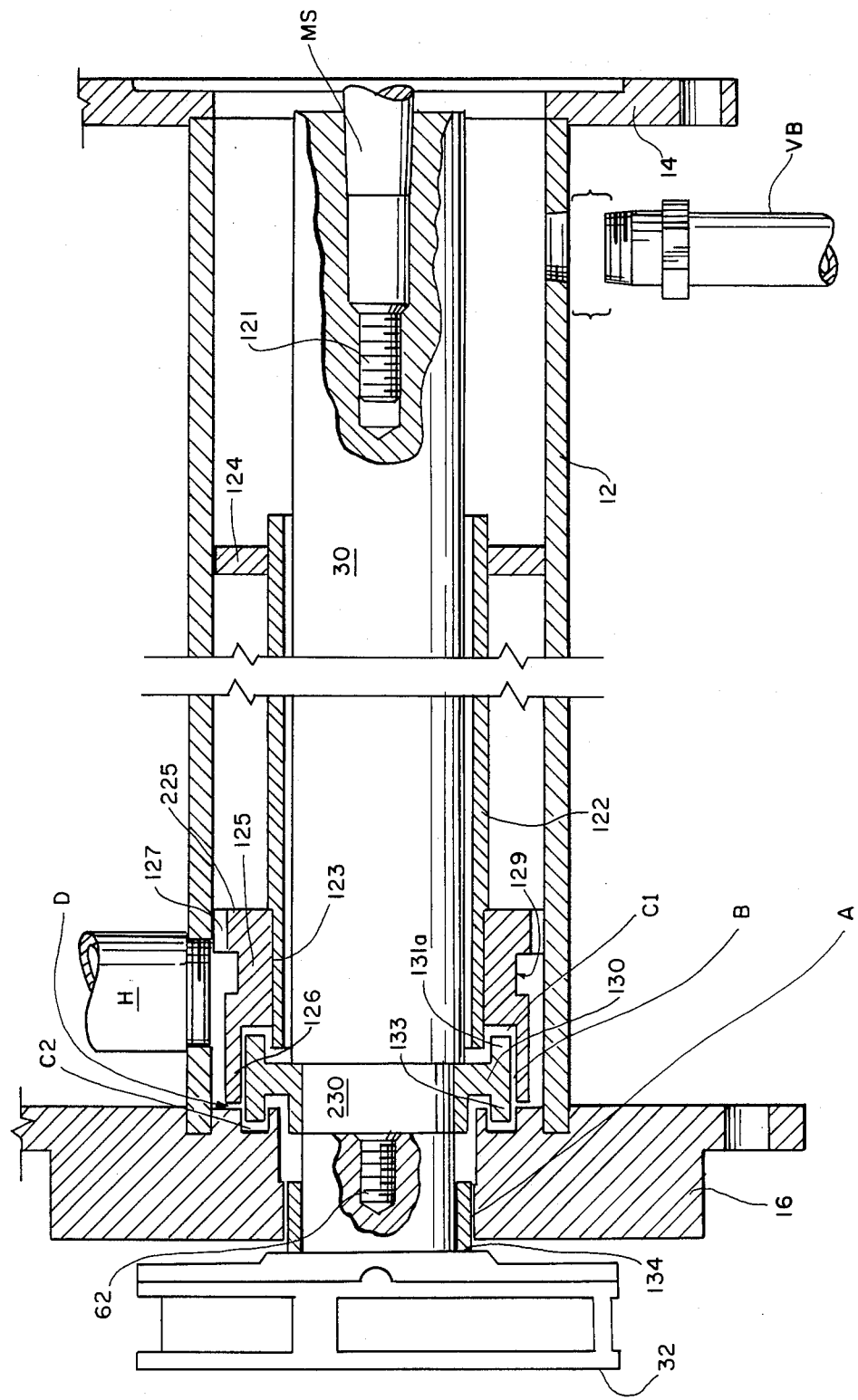
FIG. 5 is a side elevational view, partly in cross-section, showing the important clearances between the structural pump elements.

As best seen in the enlarged assembled structure of FIG. 5, skirt 125 and ring 124 support sleeve 122 within extension tube 12 with the drive shaft 30 extending lengthwise thereof.

To complete the seal construction of the present invention, a runner 130 is fixedly mounted upon reduced end 230 of the drive shaft 30. Thus, as the drive shaft 30 is rotated at a high speed, the runner 130 will likewise rotate at a high speed. Runner 130 is provided with extensions 131a and 133 extending from opposite sides thereof. The extension 131a cooperates with the recessed area C1 (as shown in FIG. 5) and the extension 133 cooperates with the recessed area C2. An important feature of the present invention is in the space provided at the top and bottom of runner 130 for creating the respective spaces C1 and C2. As indicated in FIG. 5, a minimum of 0.125" should be provided for the purpose of permitting drive shaft 30 thermal expansion during actual operation of this pump. The inventor has discovered in actual use that without this amount of gap, the elements 130 and 125, as well as flange 16, can interfere and bind. In fact, during actual experiments it was discovered that with spacing less than indicated, serious interference, even to the point of freezing up and preventing any rotation whatsoever, could occur when the pump is used for moving cooking oil at the temperatures at which the oil is heated in order to properly cook food. This was an unexpected problem which was never anticipated during the initial design and construction of this pump. It was discovered that the drive shaft 30, in part because of its fairly substantial length, will expand as much as 0.05" in length at 150° F. temperature. Thus, the clearance provided for by this invention, i.e., 0.125", will still allow an adequate gap for proper operation of the device at the high operating temperatures and will avoid any occurrence of interference or binding.

While looking at FIG. 5 it should be noted that the side clearance B between the runner and the extension portion 126 of skirt 125 is approximately 0.002". This relatively small clearance is for the purpose of retarding fluid (cooking oil) flow. It should also be noted that a gap D of 0.01" is provided between the end of extension 126 and the inward face of flange 16. This is so that fluid may flow from the pump area into the low pressure area of extension tube 12. The hose H which is connected to the input side of the pump during operation creates a vacuum within extension tube 12. In order for this vacuum to be maintained within the desired range of 6"–14" of water has a vacuum breaker VB is installed at the upper end of extension tube 12. This vacuum breaker VB can be adjusted and set for the preferred amount of vacuum as desired for a particular installation.

A bearing 134 is press fitted onto the hub 34 of impeller 32 for rotatably mounting same from the bottom support flange 16. The desired clearance A for bearing 134 is preferably 0.001". Of course, this small clearance will in and of itself reduce the amount of fluid flow at bearing 134 into the cavity under vacuum of extension tube 12.

Figure 2:
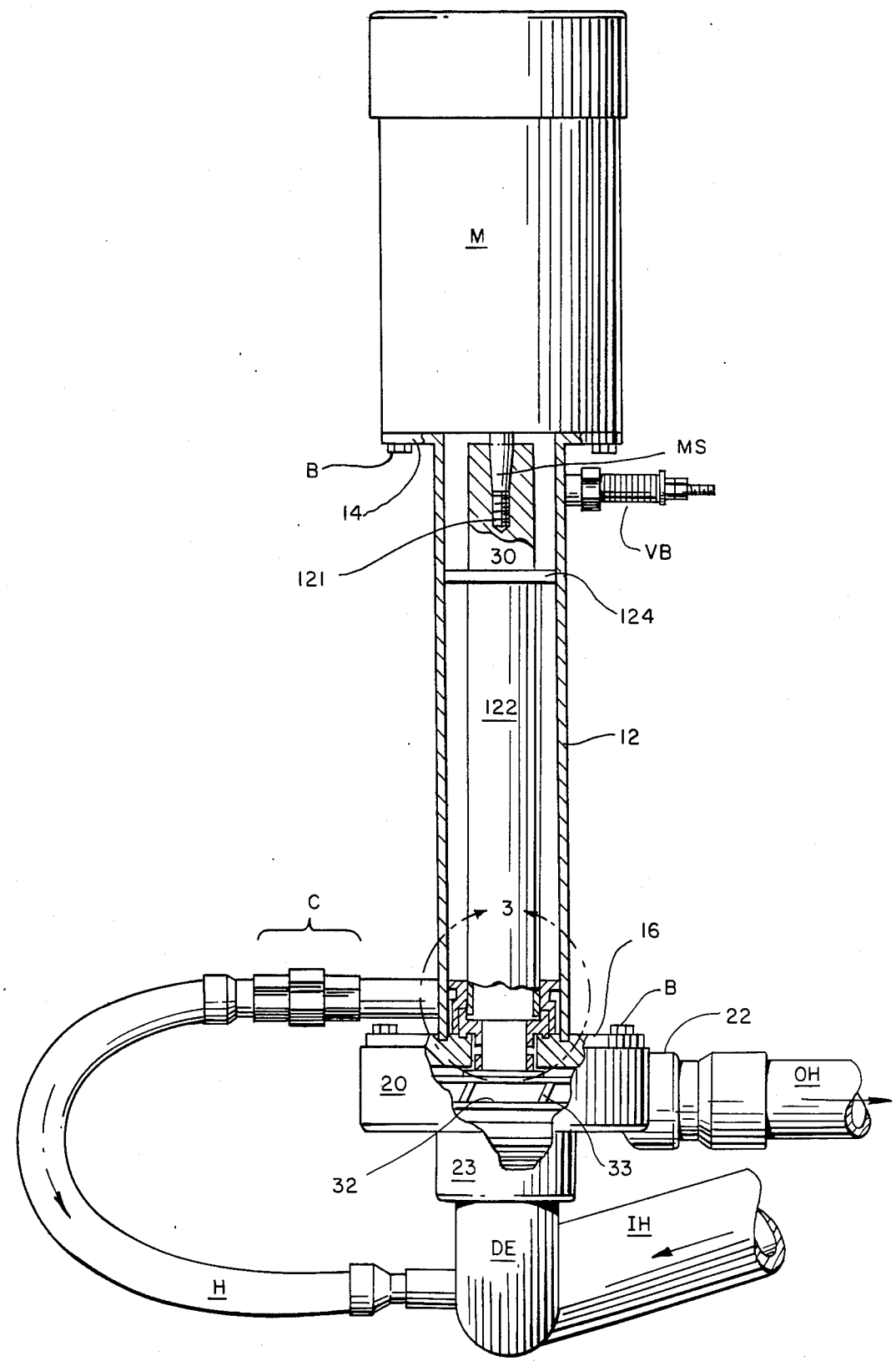
FIG. 2 is a side elevational view, partly in cross-section, of the pump assembly depicted in FIG. 1.
Figure 3:
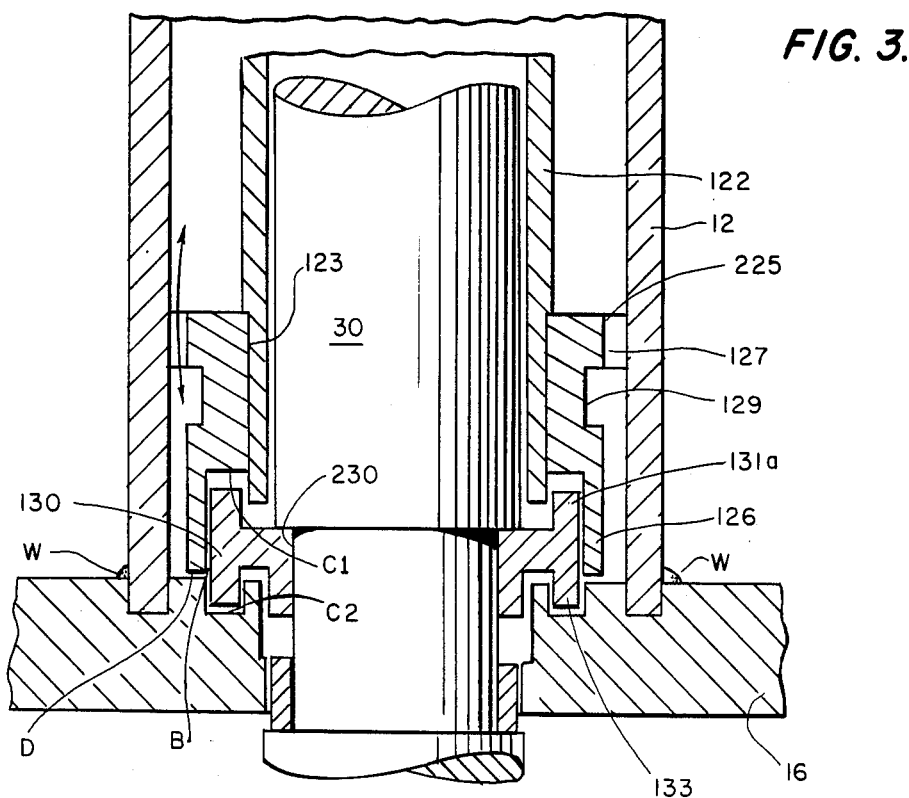
FIG. 3 is an enlarged elevational view of the encircled portion 3 of FIG. 2.
Figure 4:
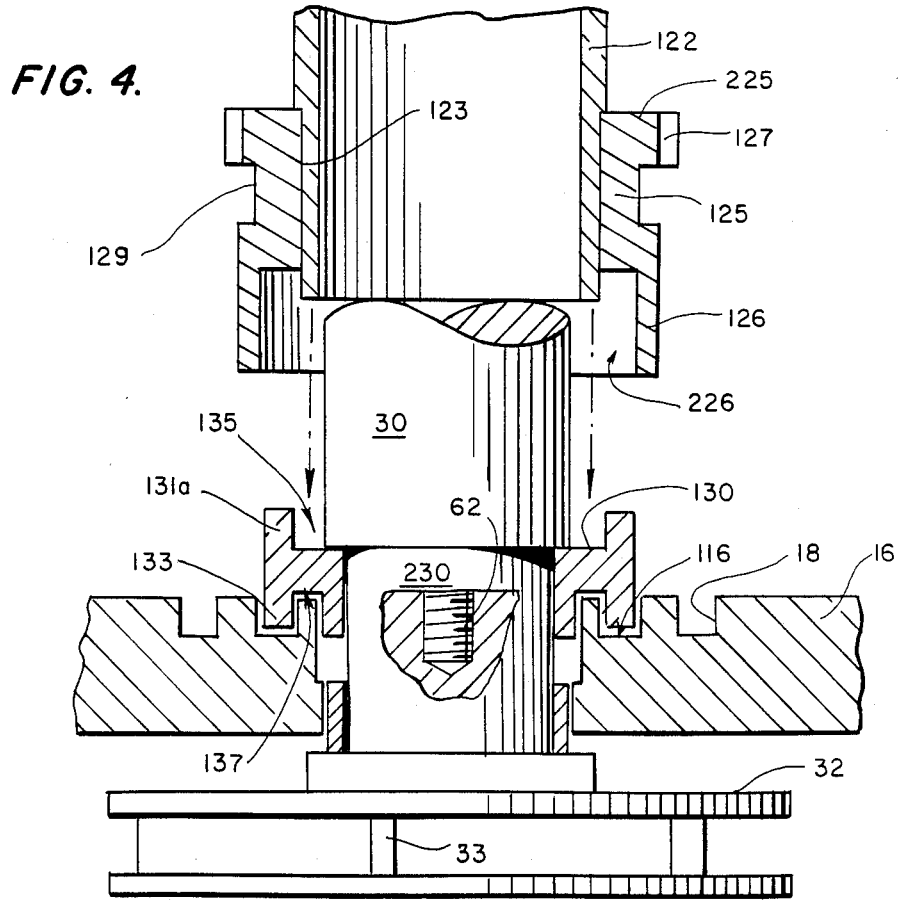
FIG. 4 is an enlarged view similar to that of FIG. 3, but with the extension tube removed and the skirt element separated from the runner on the drive shaft.

Looking at FIGS. 3 and 4, the enlarged portions of the runner and skirt area of FIG. 2, the recess 18 in flange 16, the recess 116 likewise in flange 16, and the opening 226 provided by the extension 126 of skirt 125, can be clearly seen. In FIG. 3 the hollow extension tube 12 has been welded W to the flange 16, while in FIG. 4 this structure is shown with tube 12 omitted.

During operation of this pump, as oriented in the preferred vertical position, the motor M is suitably energized and high speed rotation of impeller 32 begins. Rotation of impeller 32 within the pump housing 20 effects a suction at the input 23 which in turn sucks oil through input hose IH into the pump. Simultaneously, the interior of extension tube 12 is put under vacuum through the coupling hose H. Because of this vacuum, oil leaking past impeller bearing 134 into the gap D, between skirt extension 126 and flange 16, will be drawn back into the pump. However, it has been observed during actual operation that enough oil, primarily because of the vacuum within extension tube 12, will be drawn into the interior of tube 12 that oil will tend to rise within tube 12 towards ring 124. However, vacuum breaker VB, when properly adjusted and set, will adjust the vacuum within tube 12 so it will be relieved and reduced prior to the oil rising beyond ring 124. Obviously, of course, this is important, since if the oil were to reach motor M and rise thereinto, serious damage could result to motor M.

Thus, the present pump has a unique labyrinth less bearing construction which is provided by the bearing 134, the runner 130 and the skirt 125.

Figure 6:
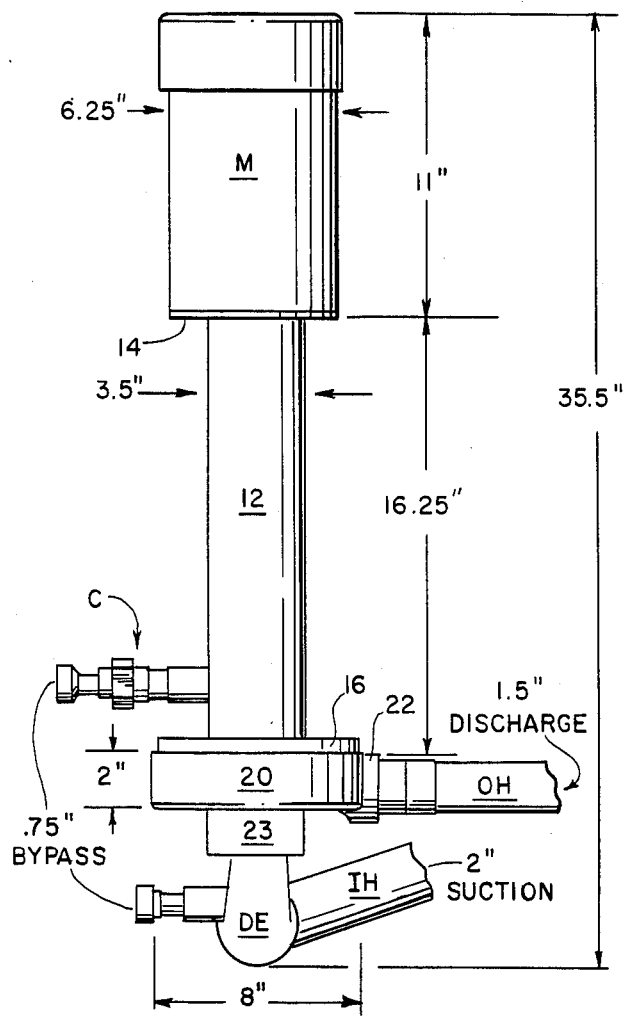
FIG. 6 is a side view depicting the overall dimensions of a preferred embodiment of the pump assembly.
Figure 7:
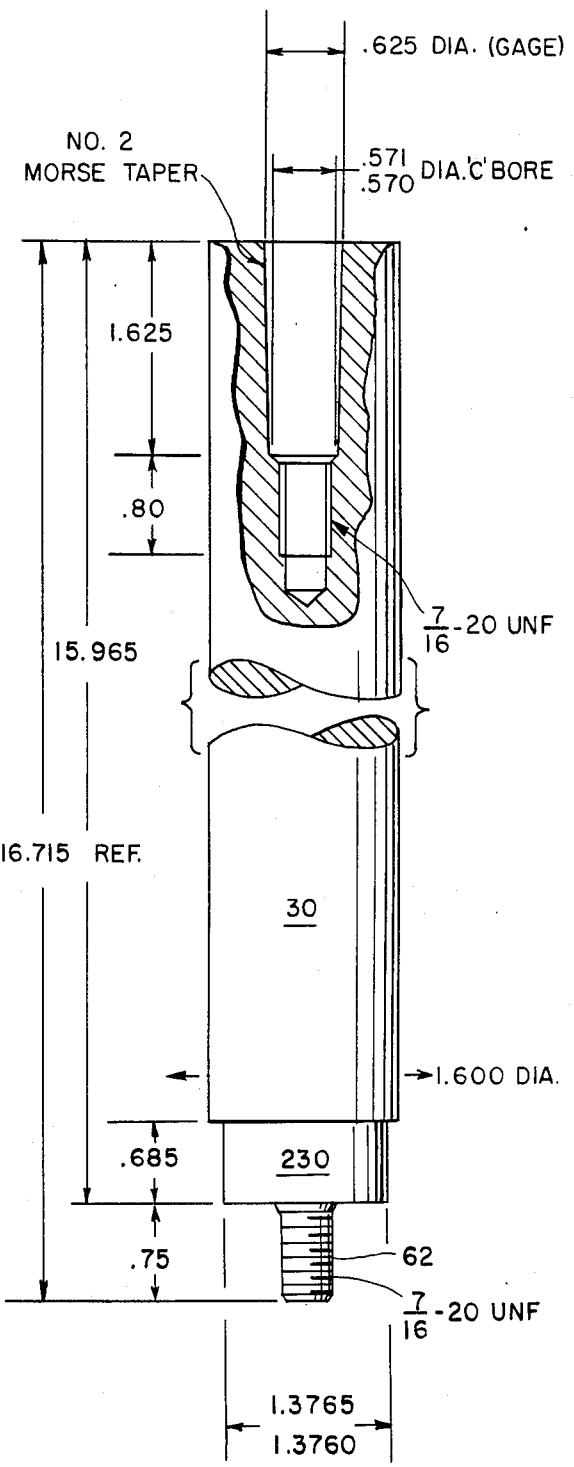
FIG. 7 is a side view depicting workable dimensions of the pump assembly of FIG. 6.

Looking at FIGS. 6 and 7 of the drawings, preferred dimensions for an operating pump are depicted. Of course, larger or smaller pumps of less or greater dimensions can oe built utilizing the invention disclosed herein; however, preferably the size ratio between the various elements will be retained approximately as depicted. Actual experiments and testing of a pump as specified has achieved new and unexpected results over known prior art centrifugal pump devices. The present invention involves a combination of small details and features, which individually may seem rather minor, but in actuality produce a very desirable and beneficial overall result.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pump assembly for effecting flow of high temperature cooking oil, comprising:
   a drive motor;
   a centrigugal pump housing;
   an elongate, hollow extension tube having a top end connected to the drive motor and a bottom end connected to the pump housing for supporting the drive motor in spaced relationship to the pump housing;
   an impeller rotatable in the pump housing;
   an elongate drive shaft extending substantially coaxially within the extension tube and connected between the drive motor and the impeller to rotate the impeller upon actuation of the drive motor, said drive shaft being radially spaced from the extension tube and defining an annular space therebetween;

labyrinth seal means for effecting a fluid seal between the pump housing and drive motor, said labyrinth seal means including an elongate tubular sleeve extending in said annular space coaxial with said drive shaft in spaced relationship to both said drive shaft and said extension tube, said sleeve having a bottom end disposed closely adjacent the pump housing, a depending skirt on the bottom end of the sleeve, and a runner on the end of said drive shaft adjacent the bottom end of the sleeve, said sleeve, skirt, runner and pump housing cooperating to form a tortuous passage therebetween defining said labyrinth seal means; and said skirt and sleeve being spaced from said runner, and said runner being spaced from said pump housing distances sufficient to accommodate thermal expansion and contraction of said drive shaft while maintaining said labyrinth seal, whereby the use of flexible seal means in such pumps may be eliminated.

2. The pump assembly of claim 1, together with means for creating a vacuum within said hollow extension tube.

3. The pump assembly of claim 2, together with vacuum breaker means attached to said extension tube to permit development of a predetermined low pressure in said extension tube and operable to limit the low pressure to a predetermined magnitude.

4. The pump assembly of claim 1, wherein said pump housing has an opening through which the drive shaft extends, and an annular channel concentric with said opening, said channel being open toward said extension tube; said runner has a depending annular wall extending into said channel in spaced relation thereto; said skirt has a depending annular wall disposed in outwardly spaced relation concentrically with said runner; and said bottom end of the sleeve and said skirt cooperate to form an annular space facing toward the pump housing and the runner has an upwardly projecting annular wall extending into said space.

5. The pump assembly of claim 4, wherein said sleeve has an upper end spaced from the drive motor; an annular, washer-like spacer is on said upper end of the sleeve and is engaged between the sleeve and extension tube to position the upper end of the sleeve in the extension tube; and said skirt has a portion engaged with the extension tube to position the bottom end of the sleeve in the extension tube.

6. A pump assembly for effecting flow of high temperature cooking oil, comprising:

a drive motor;

a centrifugal pump housing having an inlet and an outlet;

an elongate, hollow extension tube having a top end connected to the drive motor and a bottom end connected to the pump housing for supporting the drive motor in spaced relationship to the pump housing;

an impeller rotatable in the pump housing;

an elongate drive shaft extending substantially coaxially within the extension tube and connected between the drive motor and the impeller to rotate the impeller upon actuation of the drive motor, said drive shaft being radially spaced from the extension tube and defining an annular space therebetween;

labyrinth seal means for effecting a fluid seal between the pump housing and drive motor;

a suction hose connected between said annular space and the inlet to the pump housing for creating a low pressure in said annular space when the pump is operating and to return fluid leaking past said labyrinth seal to the pump inlet; and vacuum breaker means connected with said annular space operable to enable a predetermined magnitude of low pressure to be developed in said spaced, but operative to limit the magnitude of the low pressure therein to said predetermined magnitude and thus limit the amount or level of leaked fluid which will be drawn into the annular space in the extension tube by the low pressure created through the suction hose.

7. The pump assembly of claim 6, wherein said labyrinth seal means further includes a runner element affixed to said drive shaft for rotation therewith.

8. The pump assembly of claim 7, together with a skirt structure affixed to the hollow extension tube for close association with said runner element.

9. The pump assembly of claim 8, wherein a bearing means is affixed to said impeller, and said bearing means has a very close operating clearance in relation to said pump housing.

10. The pump of claim 6, wherein sad labyrinth seal means includes a runner mounted on said drive shaft, together with a skirt associated with said extension tube, said runner and skirt being provided with elongated labyrinth passageways therebetween with sufficient clearance therebetween to permit thermal expansion of the operating components to take place without interference or binding of said runner and skirt.

11. The pump of claim 10, further including a bearing support for the drive shaft having a very close clearance with said pump housing for supporting said drive shaft.

* * * * *